United States Patent
Wang

(10) Patent No.: US 10,924,293 B2
(45) Date of Patent: Feb. 16, 2021

(54) METHOD OF RETRIEVING NETWORK CONNECTION AND NETWORK SYSTEM

(71) Applicant: QNAP SYSTEMS, INC., New Taipei (TW)

(72) Inventor: Shih-Chun Wang, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 296 days.

(21) Appl. No.: 16/136,258

(22) Filed: Sep. 20, 2018

(65) Prior Publication Data
US 2019/0372792 A1    Dec. 5, 2019

(30) Foreign Application Priority Data
May 30, 2018   (TW) .............................. 107118584 A

(51) Int. Cl.
*H04L 12/18*    (2006.01)
*H04L 12/24*    (2006.01)
*H04L 12/26*    (2006.01)

(52) U.S. Cl.
CPC ...... *H04L 12/1868* (2013.01); *H04L 12/1886* (2013.01); *H04L 41/069* (2013.01); *H04L 41/0672* (2013.01); *H04L 43/10* (2013.01)

(58) Field of Classification Search
CPC . H04L 12/12; H04L 12/1868; H04L 12/1886; H04L 41/0672; H04L 41/069;
(Continued)

(56) References Cited

U.S. PATENT DOCUMENTS 7,480,250 B2 *   1/2009   Choi ................. H04L 29/12018
                                                         370/242
9,471,285 B1 *  10/2016   Koohgoli .................. G06F 8/75
(Continued)

FOREIGN PATENT DOCUMENTS

CN    102984295    8/2015
TW    201620271    6/2016

OTHER PUBLICATIONS

"Office Action of Taiwan Counterpart Application," dated Nov. 29, 2018, p. 1-p. 8.

*Primary Examiner* — Marsha D Banks Harold
*Assistant Examiner* — Dharmesh J Patel
(74) *Attorney, Agent, or Firm* — JCIPRNET

(57) ABSTRACT

A network connection retrieving method and a network system are provided. The method is adapted for retrieving connections between network devices by a master device among network devices in a local area network, and includes: attempting to establish the connection with a current device according to a pre-recorded network address of the current device; sending a plurality of broadcast packets to each of the network devices in the local area network if the step of establishing the connection failed, and collecting a response message returned from each of the network devices in response to the broadcast packets; and identifying the response message returned from the current device by comparing unique identification information recorded in each of the response messages with pre-recorded unique identification information of each of the network devices, and using the network address recorded in the response message to re-establish the connection with the current device.

18 Claims, 5 Drawing Sheets

(58) Field of Classification Search
CPC ... H04L 43/10; H04L 43/0811; H04L 49/354; H04L 61/1511; H04L 61/2007; H04L 61/2015; H04L 63/08; H04L 63/0236
See application file for complete search history.

(56) References Cited

U.S. PATENT DOCUMENTS

| | | | |
|---|---|---|---|
| 2008/0052384 A1* | 2/2008 | Marl | H04L 41/0273 709/223 |
| 2015/0334632 A1 | 11/2015 | Rudolph et al. | |
| 2015/0341189 A1* | 11/2015 | Zhang | H04L 61/2015 370/338 |
| 2016/0349993 A1* | 12/2016 | Udupi | G06F 3/0689 |

* cited by examiner

METHOD OF RETRIEVING NETWORK CONNECTION AND NETWORK SYSTEM

CROSS-REFERENCE TO RELATED APPLICATION

This application claims the priority benefit of Taiwan application serial no. 107118584, filed on May 30, 2018. The entirety of the above-mentioned patent application is hereby incorporated by reference herein and made a part of this specification.

BACKGROUND OF THE INVENTION

1. Field of the Invention

The invention relates to a network connection method and a network system, and more particularly, relates to a network connection retrieving method and a network system using the same.

2. Description of Related Art

In recent years, with rapid advancement of computer technology, remote control technologies have been widely adopted. Users are able to operate a computer system remotely via a network. For example, a common user may control the computer system at home or office anywhere and anytime by using a remote control to perform a remote task. By utilizing the remote control, system administrators may further obtain messages such as a hardware status or a system event log record of the computer system, so as to handle current statuses of the computer system at any time without restriction by time and space (while improving the management efficiency).

In response to various needs, many companies tend to continue increasing the number of internal servers, and manage multiple servers at the same time through a management server. In general, when setting up network parameters on internal servers in the company for network connections, network administrators often need to operate in front of each server in person and obtain Internet Protocol (IP) address by activating Internet Protocol and using Dynamic Host Configuration Protocol (DHCP).

However, in terms of the current network architecture, if IP of one particular server is somehow changed, that particular server may not be found and connected to by the management server and other servers in a local area network. In such case, the network administrators needs to log in a switch in the local area network with a system administrator identity in order to re-establish the connection with that particular server by obtaining a new IP address of that particular server, manually inputting the new IP address of that particular server (which needs to be obtained in advance) into each of the server, or obtaining the new IP address by directly connecting each of the servers with that particular server by cable lines (hardwire connection).

SUMMARY OF THE INVENTION

The invention provides a network connection retrieving method and a network system, which can obtain unique identification information of each network device and record the same in a master device. Accordingly, when the internetwork protocol (IP) address of one network device is changed, the unique identification information may be used to re-establish a network connection with that network device.

The network connection retrieving method is adapted for retrieving network connections between a plurality of network devices by the master device among the network devices in a local area network. The network connection retrieving method includes the following steps: attempting to establish the connection with a current device among the network devices according to a pre-recorded network address of the current device; sending a plurality of broadcast packets to each of the network devices in the local area network if the connection cannot be established, and collecting a response message returned from each of the network devices in response to the broadcast packets; and identifying the response message returned from the current device by comparing unique identification information recorded in each of the response messages with pre-recorded unique identification information of each of the network devices, and re-establishing the connection with the current device by using the network address recorded in the response message.

The network system of the invention includes a plurality of network devices. The network devices include a master device and a plurality of slave devices in a local area network. The master device includes a communication device, a storage medium and a processor. The communication device establishes a connection with each of the slave devices. The storage medium stores a network address of each of the network devices. The processor is coupled to the communication device and the storage medium, and configured to attempt to establish the connection with a current device by using the communication device according to a pre-recorded network address of the current device in the storage medium. Here, the processor sends a plurality of broadcast packets to each of the network devices in the local area network by using the communication device if the connection cannot be established, collects a response message returned from each of the network devices in response to the broadcast packets, identifies the response message returned from the current device by comparing unique identification information recorded in each of the response messages with pre-recorded unique identification information of each of the network devices, and re-establishes the connection with the current device by the communication device using a network address recorded in the identified response message.

Based on the above, according to the invention, the unique identification information of each network device is pre-recorded in the master device. By doing so, when the connection between the network devices is disconnected, the master device may send broadcast packets to each network device and identify the response message of the network device by using the unique identification information so as to find the disconnected network device, obtain its new network address, and eventually retrieve the connection with that network device.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
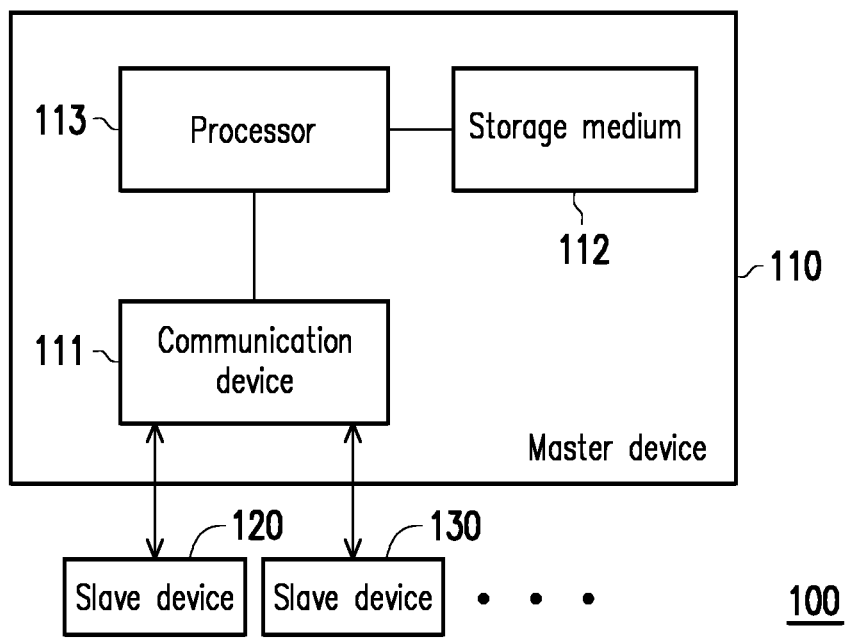
FIG. 1 is a schematic diagram illustrating a network system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

With reference to FIG. 1, FIG. 1 is a schematic diagram illustrating a network system according to an embodiment of the invention. A network system 100 of this embodiment includes a plurality of network devices 110, 120 and 130 connected to each other via a local area network. For simplicity, only the network devices 110, 120 and 130 are illustrated in this embodiment. In this embodiment, the network device 110 is a master device configured to manage each of the network devices in the local area network, and the network devices 120 and 130 are slave devices. The master device 110 includes a communication device 111, a storage medium 112 and a processor 113. The communication device 111 establishes network connections with the slave devices 120 and 130. The storage medium 112 is configured to store network addresses of the slave devices 120 and 130.

The communication device 111 is, for example, a wireless network card in compliance with a wireless communication standard (e.g., institute of electrical and electronics engineers (IEEE) 802.11n/b/g), or a network card in compliance with a wired network connection such as Ethernet. The communication device can connect to a network in a wired or wireless manner and establish network connections with other network devices in the network.

The storage medium 112 is, for example, a fixed or a movable device in any form, including a random access memory (RAM), a read-only memory (ROM), a flash memory or other similar devices, or a combination of the above-mentioned devices.

The processor 113 is, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices.

The processor 113 is coupled to the communication device 111 and the storage medium 112, and is configured to perform the network connection retrieving method described in the embodiments of the present application according to pre-recorded network addresses of the network devices (e.g., the slave devices 120 and 130) in the storage medium 112. Various embodiments are provided below and served to describe detailed step of said method.

Figure 2:
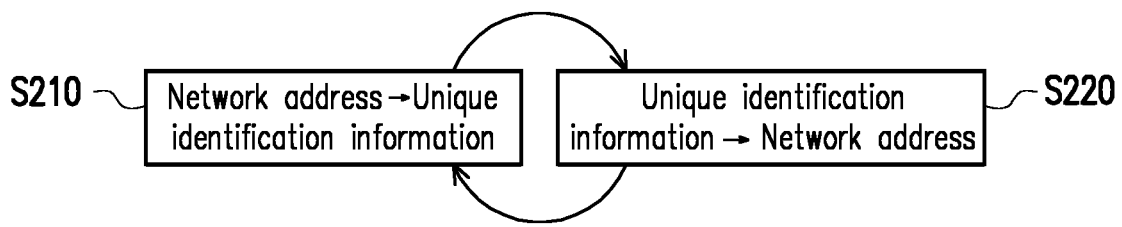
FIG. 2 is a simplified flowchart illustrating a network connection retrieving method according to an embodiment of the invention.

With reference to both FIG. 1 and FIG. 2, FIG. 2 is a simplified flowchart illustrating a network connection retrieving method according to an embodiment of the invention. In this embodiment, when the master device 110 in the local area network establishes the network connections with the slave devices 120 and 130, in step S210, the master device 110 connects to each of the slave devices 120 and 130 according to the network addresses of the slave devices 120 and 130 so as to obtain their unique identification information, and associates the unique identification information with the network addresses of the slave devices 120 and 130 to create an information list (as shown by Table 1), which is then recorded in the master device 110.

TABLE 1

| Slave device | Network address | Unique identification information |
|---|---|---|
| Slave device 120 | 10.19.1.1 | 00:0c:29:B7:e9:d6 |
| Slave device 130 | 10.19.1.2 | 00:0c:a2:B7:e9:b1 |
| ... | ... | ... |

In Table 1, the master device 110 records the network addresses and the unique identification information of the slave devices 120 and 130. Here, the unique identification information may include one or a combination of Media Access Control Address (MAC Address), a network card name, a device name, a device model of the network device. For example, in the unique identification information of the slave device 120, MAC Address is 00:0c:29:B7:e9:d6, and the network address is 10.19.1.1. In the unique identification information of the slave device 130, MAC Address is 00:0c:a2:B7:e9:d1, and the network address is 10.19.1.2. Herein, a data format of the unique identification information is not particularly limited.

In an embodiment, the unique identification information described above may also be a numbering or a serial number dynamically generated by an encoding algorithm executed by one particular network device with computing capability in the local area network. The numbering or the serial number may also be assigned to other network devices in the local area network by that particular network device via the local area network. Here, the encoding algorithm includes MD5, Secure Hash Algorithm 1 (SHA-1), Secure Hash Algorithm 2 (SHA-2), Secure Hash Algorithm 3 (SHA-3), BLAKE2, CubeHash, ECOH, FSB, GOST, HAS-160, HAVAL, Kupyna, LMhash, MD2, MD4, MD6, MDC-2, N-Hash, RIPEMD, RadioGaún, SWIFFT, Snefru, Streebog, Tiger, VSH, Whirlpool or other algorithms with Hash or numbering functions. Nonetheless, the present embodiment is not limited in this regard.

When the connections of the master device 110 or other network devices with the current device (here, the slave device 120 is taken as an example) are disconnected, the method proceeds to step S220. In this step, the master device 110 can request, by releasing broadcast packets, each of the network devices (including the slave device 120) in the local area network to return a response message, identify the response message sent from the slave device 120 by using the previously obtained unique identification information of the slave device 120, and obtain a new network address of the slave device 120 from the response message to thereby re-establish a connection with the slave device 120.

Figure 3:
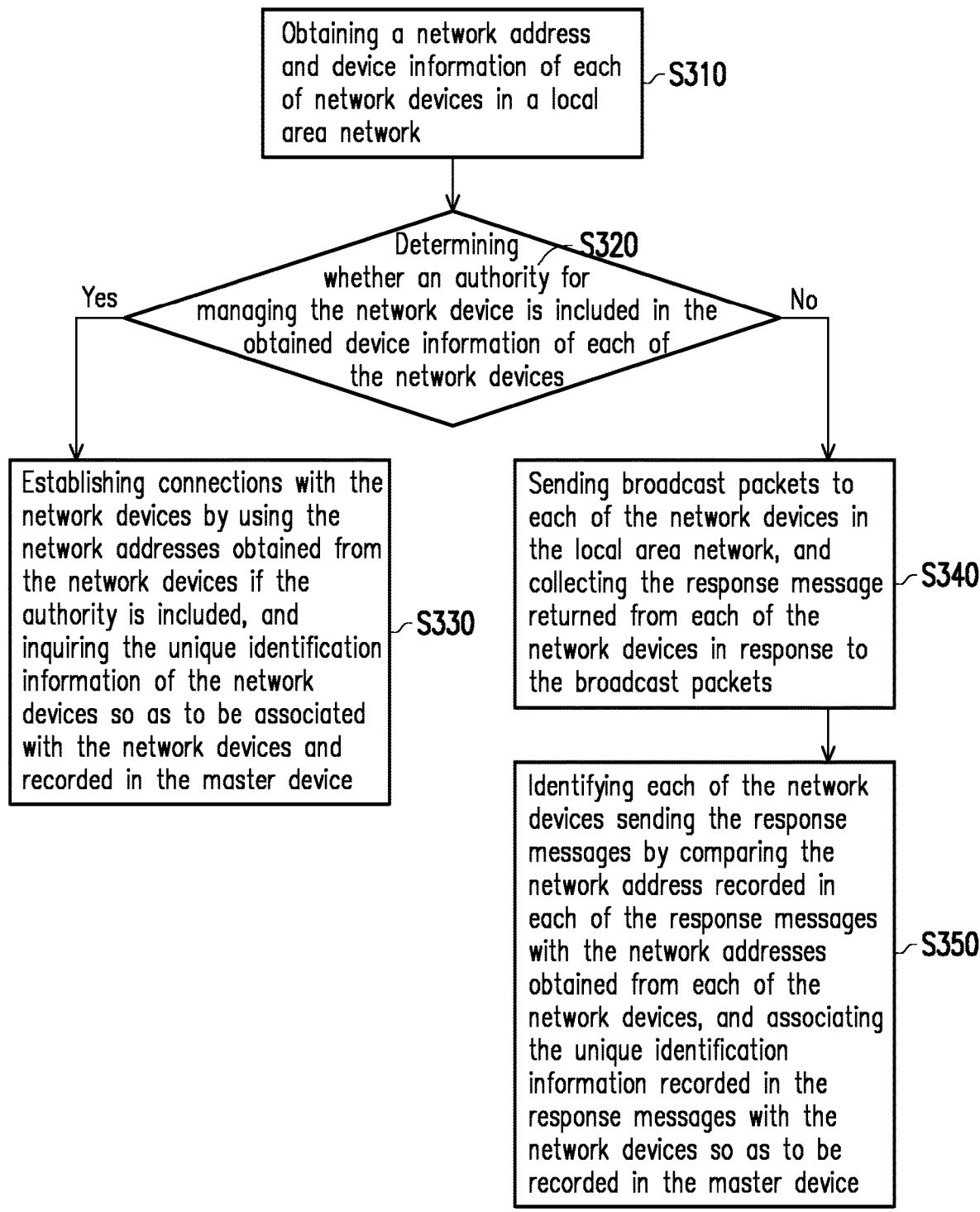
FIG. 3 is a flowchart illustrating how unique identification information is obtained in advance in the network connection retrieving method according to an embodiment of the invention.

More specifically, detailed procedure for obtaining the unique identification information in advance may refer to FIG. 1 and FIG. 3 together. FIG. 3 is a flowchart illustrating how unique identification information is obtained in advance in the network connection retrieving method according to an embodiment of the invention. When the master device 110 connects to each of the network devices (e.g., the slave devices 120 and 130) for the first time, the processor 113 obtains network addresses and device information from each of the slave devices 120 and 130 in the local area network in step S310. Then, in step S320, the processor 113 determines whether an authority for managing the slave device is included in the obtained device information of each of the slave devices 120 and 130.

If the authority is included in the obtained device information, the method proceeds to step S330. In this step, the processor 113 establishes the connections with the slave devices 120 and 130 by using their own network addresses, and inquires the unique identification information of each of the slave devices 120 and 130 so as to associate the devices 120 and 130 with the master device 110 and record the unique identification information and the network addresses (e.g., as an information list shown by Table 1) in the storage medium 112 of the master device 110. Otherwise, if the authority is not included in the obtained device information, the method proceeds to step S340. In this step, the processor 113 sends broadcast packets to each of the slave devices 120 and 130 in the local area network by using the communication device 111. When receiving the broadcast packets, each of the slave devices 120 and 130 can return the response message in response to the broadcast packets. After the response message are returned from the slave devices 120 and 130, the communication device 111 can collect the response message returned from each of the slave devices 120 and 130. In step S350, the processor 113 identifies each of the slave devices 120 and 130 sending the response messages by comparing the network address recorded in each of the response messages with the network addresses obtained in step S310, and associates the unique identification information recorded in the response messages with the slave devices 120 and 130 so as to be recorded in the storage medium 112 in the master device 110.

Figure 4:
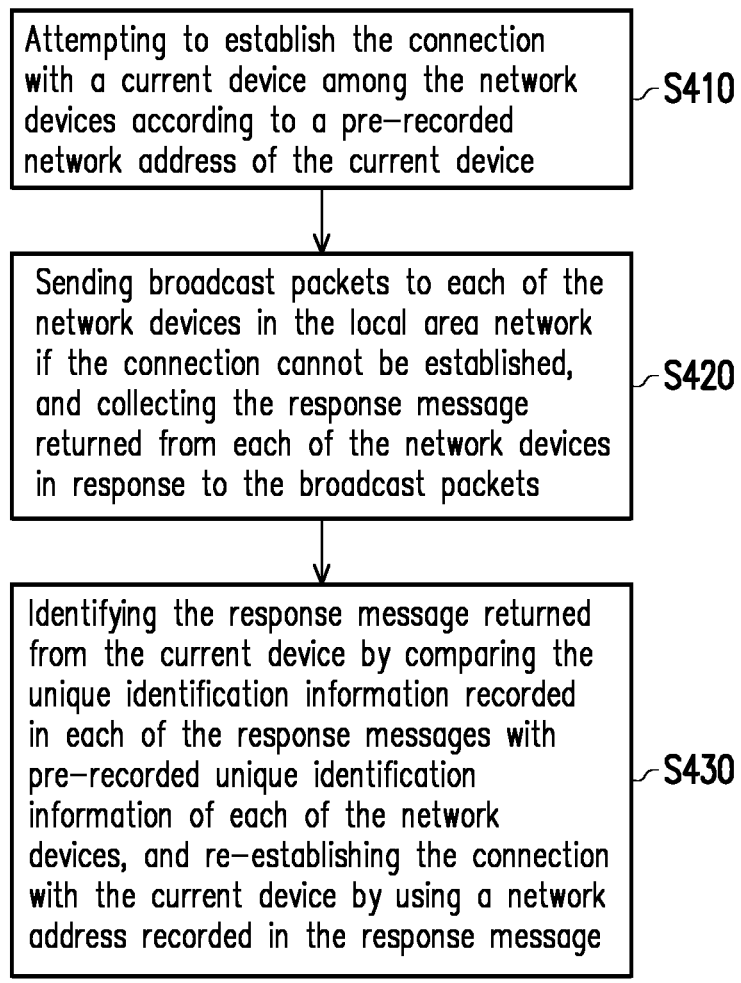
FIG. 4 is a flowchart illustrating a network connection retrieving method according to an embodiment of the invention.

In conjunction with the above, detailed procedure for retrieving network connection may refer to FIG. 1 and FIG. 4 together. FIG. 4 is a flowchart illustrating a network connection retrieving method according to an embodiment of the invention. In this embodiment, the network connection retrieving method is adapted for retrieving network connections between a plurality of network devices by the master device 110 among the network devices in a local area network.

When the master device 110 is disconnected from the current device (here again, the slave device 120 is taken as an example), or when the master device 110 receives a request for establishing the connection with the slave device 120 from another network device (e.g., from the slave device 130), the method proceeds to step S410. In this step, the processor 113 in the master device 110 attempts to establish the connection with the slave device 120 by using the communication device 111 according to a pre-recorded network address of the slave device 120 in the storage medium 112.

Next, in step S420, if the master device 110 is still unable to establish the connection with the slave device 120, the processor 113 then sends a plurality of broadcast packets to each of the network devices (i.e., the slave devices 120 and 130) in the local area network by using the communication device 111, and each of the network devices can return the response message in response to the broadcast packets when receiving the broadcast packets. After the response messages are returned from each of the network devices, the communication device 111 can collect the response messages returned from the network devices. In step S430, the processor 113 identifies the response message returned from the slave device 120 by comparing the unique identification information recorded in all the response message with pre-recorded unique identification information of each of the network devices in the storage medium 112, stores a network address of the slave device 120 recorded in the response message into the information list (as shown by Table 1) as an update, and re-establishes the connection with the slave device 120 by the network address through the communication device 111.

It should be noted that, in an embodiment, although the master device 110 can obtain the network address of the slave device 120 to be connected by sending the broadcast packets, it is possible that the slave device 120 cannot be instantly connected to the other devices due to factors like incomplete setting or execution for connection software or incomplete construction for software/hardware environment. In such case, if the master device 110 still attempts to connect the slave device 120, resources may be wasted since the connection may not be successfully established even after many attempts. Accordingly, in this embodiment, for example, before re-establishing the connection with the slave device 120 by the network address through the communication device 111, the processor 113 can execute a ping command on the network address to verify whether the network address is valid in advance by testing whether a packet is able to reach the slave device 120. Here, if the packet is unable to reach the slave device 120 through the network address, the processor 113 then verifies that the network address is invalid and temporarily stops using the network address to establish the connection. For example, the processor 113 can periodically execute the ping command on the network address per a predetermined time interval to determine whether the network address is restored to be valid, and re-establish the connection with the slave device 120 by using the network address when determining that the network address is restored to be valid. In this way, the master device 110 can establish the connection with the slave device 120 only after verifying that the slave device 120 is restored to valid, so as to prevent the resources from being wasted by repeatedly establishing the connection.

Further, in an embodiment, when receiving a request for establishing the connection with the slave device 120 sent from another network device (e.g., the slave device 130) among the network devices, after identifying the response message returned from the slave device 120, the master device 110 can transmit the network address returned from the slave device 120 to the slave device 130, so as to assist the slave device 130 to re-establish the connection with the slave device 120.

Figure 5A:
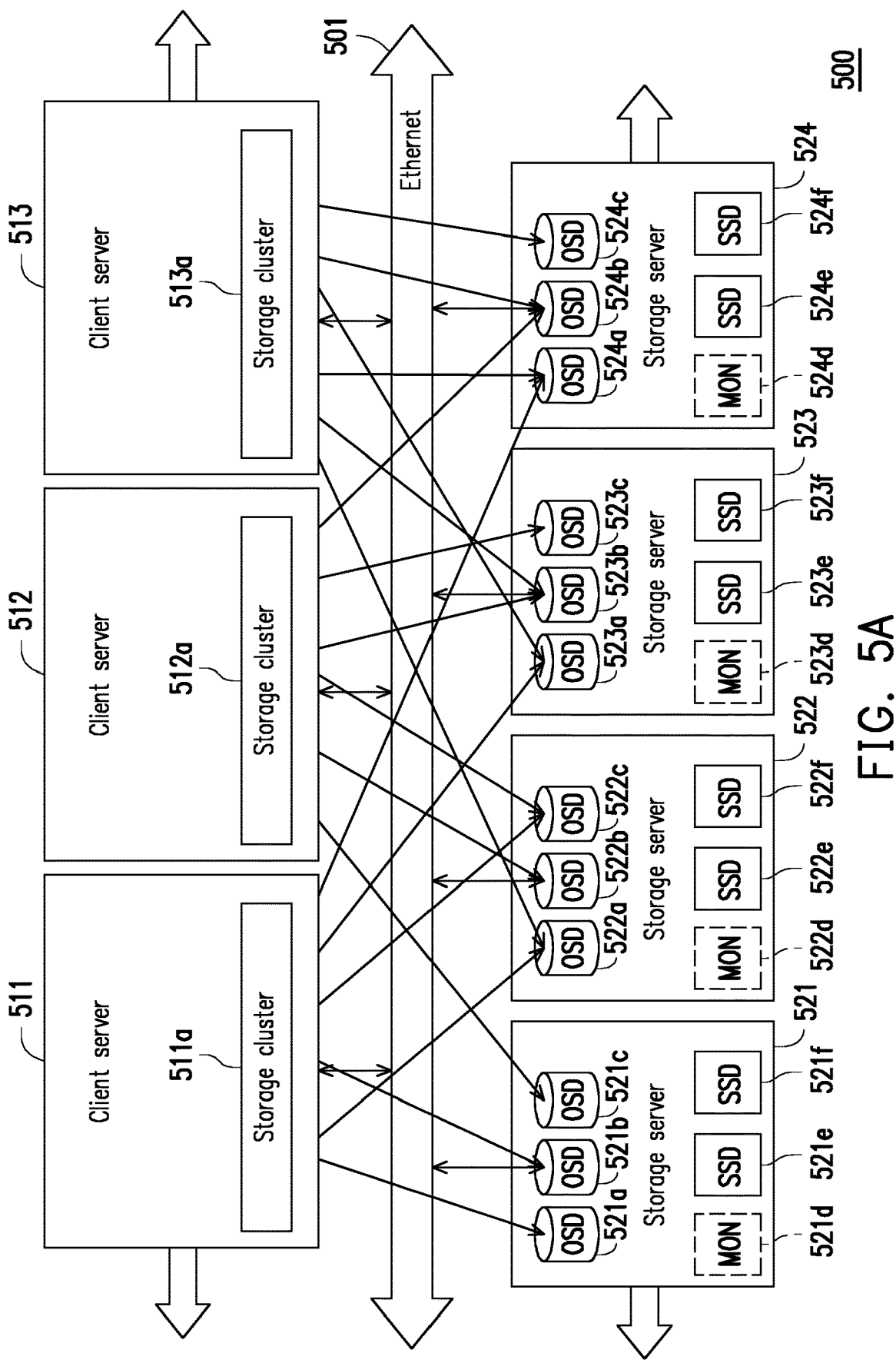
FIG. 5A is a device block diagram illustrating implementation of a Ceph storage architecture in the network connection retrieving method according to an embodiment of the invention.

In an embodiment, the network connection retrieving method of the invention is applicable to a Ceph storage architecture. With reference to FIG. 5A, FIG. 5A is a schematic diagram illustrating the network connection retrieving method applied in the Ceph storage architecture according to an embodiment of the invention. In this embodiment, the master device is a client server in the Ceph storage architecture, and the rest of the slave devices are storage servers in the Ceph storage architecture. Here, a Ceph storage architecture 500 includes a plurality of client servers 511, 512 and 513 and a plurality of storage servers 521, 522, 523 and 524. The client servers 511, 512 and 513 include storage clusters 511a, 512a and 513 respectively. Further, a total storage cluster is formed by the storage clusters 511a, 512a and 513a. Here, the storage clusters 511a, 512a and 513a are reliable autonomic distributed object storage (RADOS) clusters. The storage servers 521, 522, 523 and 524 respectively include: object storage daemons (OSD) 521a to 521c, 522a to 522c, 523a to 523c,524a to 524c; monitors (MON) 521d, 522d, 523d, 524d; and solid state disks (SSD) 521e, 521f, 522e, 522f, 523e, 523f, 524e and 524f. Here, with the client server 511 and the storage server 521 taken as an example, the storage cluster 511a of the client server 511 can communicate with the object storage daemons 521a and 521b in the storage server 521 via an Ethernet 501. The object storage daemons 521a to 521c are configured to store data, automatically overwrite or restore previously stored data to each other, and regularly return current health statuses of the solid state disks 521e and 521f and the data to the monitor 521d. Although the solid state disk is used as an example of the storage medium in the storage server, in other embodiments, the storage server may also adopt storage media of other types, including hard disks (HD), flash memories or a combination of the storage media of other types, and its application range is not limited by the present embodiment.

It should be noted that, in the Ceph storage architecture, when the client server 511 is disconnected from the storage server 521, the client server 511 can change to use other network devices (e.g., the storage servers 522, 523 and 524). For example, data originally predetermined to be transmitted to the storage server 521 is transmitted to the storage server 522, and data previously stored in the storage server 521 is synchronized to the other network devices (i.e., the storage servers 522, 523 and 524), so as to prevent data loss due the storage server 521 being disconnected or damaged.

Figure 5B:
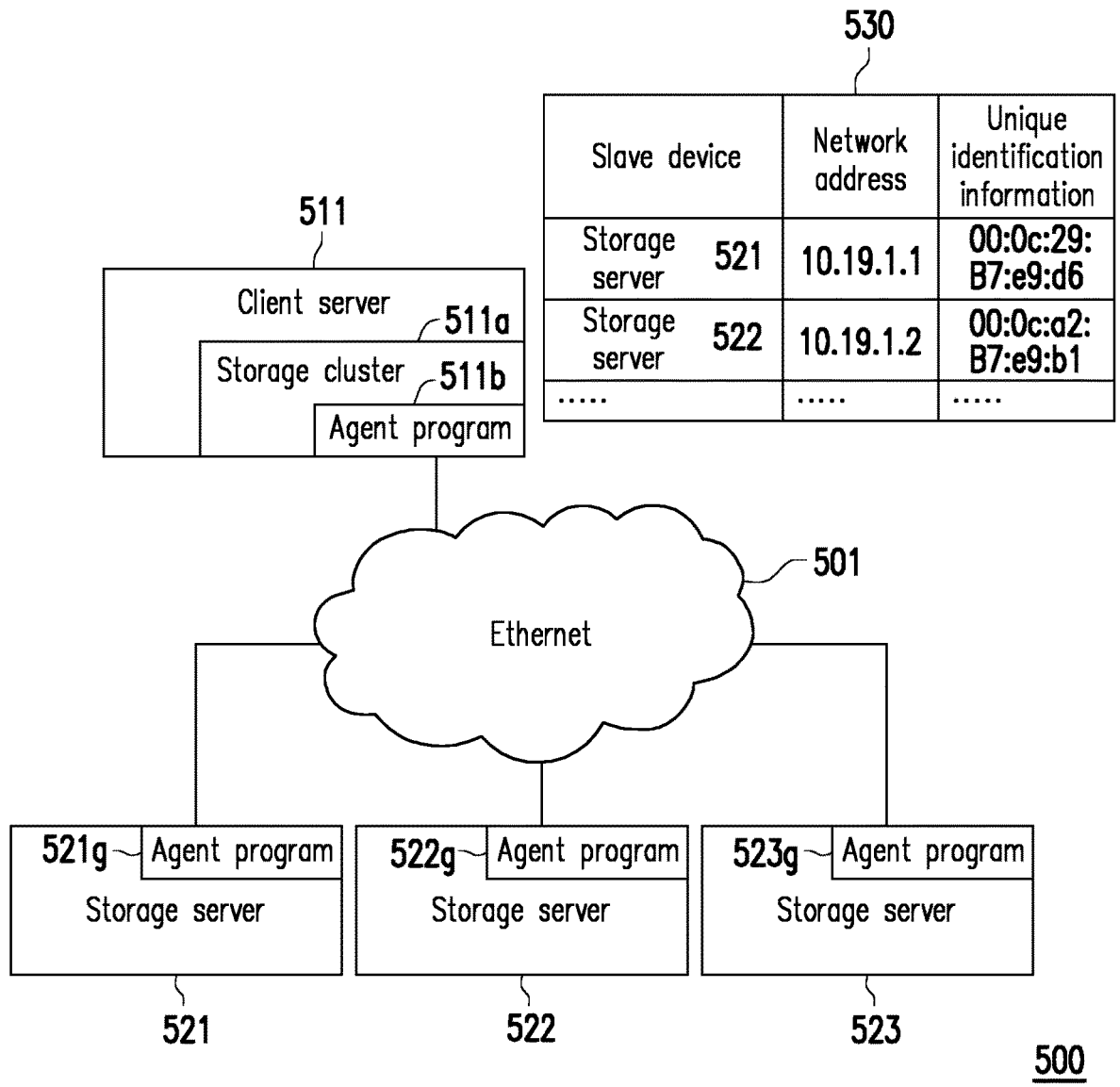
FIG. 5B is a simplified device block diagram illustrating implementation of a Ceph storage architecture in the network connection retrieving method according to the embodiment of FIG. 5A in the invention.

More specifically, detailed implementation of the network connection retrieving method applied in the Ceph storage architecture can refer to FIG. 5B. FIG. 5B is a simplified device block diagram illustrating implementation of a Ceph storage architecture in the network connection retrieving method according to the embodiment of FIG. 5A in the invention. For simplicity, only the client server 511 (i.e., the master device), the storage devices 521, 522 and 523 (i.e., the slave devices), and information list 530 in the Ceph storage architecture 500 are illustrated in this embodiment and accordingly described.

When the client server 511 connects to the storage servers 521, 522 and 523 for the first time, by installing an agent program 511b in the storage cluster 511a in the client server 511 and respectively installing agent programs 521g, 522g and 523g in the storage servers 521, 522 and 523, the agent program 511b in the client server 511 can then obtain network addresses and device information of the storage servers 521, 522 and 523 from the agent programs 521g, 522g and 523g of the storage servers 521, 522 and 523 via the Ethernet 501. The client server 511 determines whether an authority for managing the storage servers is included in the obtained device information of each of the storage servers 521, 522 and 523.

If the authority for managing the storage servers 521, 522 and 523 is included in the device information, the client server 511 can establish connections with the storage servers 521, 522 and 523 by using the network address of the storage servers 521, 522 and 523, inquire unique identification information of the storage servers 521, 522 and 523 to be associated with each of the network devices and the client server 511, and record the network addresses and the unique identification information in the client server 511 so as to create the information list 530. In the information list 530, in the unique identification information of the storage server 521, MAC Address is 00:0c:29:B7:e9:d6, and the network address is 10.19.1.1. In the unique identification information of the storage server 522, MAC Address is 00:0c:a2:B7:e9:d1, and the network address is 10.19.1.2.

Otherwise, if the authority for managing the storage servers 521, 522 and 523 is not included in the device information, the client server 511 sends broadcast packets to each of the storage servers 521, 522 and 523 in the Ethernet 501. When receiving the broadcast packets, the storage servers 521, 522 and 523' return response messages through the agent programs 521g, 522g and 523g in response to the broadcast packets. Then, the client server 511 collects the response messages returned from the storage servers 521, 522 and 523, identifies the storage servers 521, 522 and 523 sending the response messages by comparing the network address recorded in each of the response messages with the previously obtained network addresses of the storage servers 521, 522 and 523, associates the unique identification information of each of the storage servers 521, 522 and 523 with the storage servers 521, 522 and 523, and records the unique identification information and the network addresses in the client server 511 to create the information list 530.

Next, when the client server 511 is disconnected from a current device (e.g., the storage device 521), the client server 511 can attempt to retrieve the connection with the storage server 521 by a pre-recorded network address within a preset period, send the broadcast packets to each of the network devices (i.e., the storage servers 521, 522 and 523) in the Ethernet 501 if the connection still cannot be retrieved within the preset period, and collect response messages returned by the agent programs 521g, 522g and 523g from each of the network devices in response to the broadcast packets. Then, the client server 511 identifies the response message returned from the storage server 521 by comparing the unique identification information recorded in each of the response messages with pre-recorded unique identification information of the storage servers 521, 522 and 523, updates the information list 530 according to the network address recorded in the response message, and re-establishes the connection with the storage server 521 by the network address.

In summary, as described in the invention, when the master device connects to other network devices for the first time, the unique identification information and the network address of each of the network devices are recorded in the master device in advance. By doing so, when the master device is disconnected from any one of the other network devices, the master device may send the broadcast packets to each of the network devices and identify the response message of the network devices by using the unique identification information, so as to find the network device to be reconnected, obtain its new network address and eventually retrieve the connection with that network device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A network connection retrieving method, adapted for retrieving connections between a plurality of network devices by a master device among the network devices in a local area network, the network connection retrieving method comprising:

attempting to establish the connection with a current device among the network devices according to a pre-recorded network address of the current device;

sending a plurality of broadcast packets to each of the network devices in the local area network if the connection cannot be established, and collecting a response message returned from each of the network devices in response to the broadcast packets; and identifying the response message returned from the current device by comparing unique identification information recorded in each of the response messages with pre-recorded unique identification information of each of the network devices, and re-establishing the connection with the current device by using a network address recorded in the response message, wherein the master device is a client server in a Ceph storage architecture, and the rest of the network devices are storage servers in the Ceph storage architecture, and wherein when the master device is disconnected from the current device, the master device attempts to retrieve the connection with the current device by the pre-recorded network address within a preset period, and if the connection cannot be retrieved within the preset period, the master device obtains the network address of the current device by sending the broadcast packets and collecting the response messages, and re-establishes the connection with the current device by using the obtained network address.

2. The network connection retrieving method according to claim 1, wherein before the step of re-establishing the connection with the current device by using the network address recorded in the response message, the network connection retrieving method further comprises:

executing a ping command on the network address to verify whether the network address is valid in advance by testing whether a packet is able to reach the current device through the network address.

3. The network connection retrieving method according to claim 2, wherein if the packet is unable to reach the current device through the network address such that the network address is verified as invalid, the network connection retrieving method further comprises:

periodically executing the ping command on the network address per a predetermined time interval to determine whether the network address is restored to be valid, and re-establishing the connection with the current device by using the network address when determining that the network address is restored to be valid.

4. The network connection retrieving method according to claim 1, wherein before the step of attempting to establish the connection with the current device among the network devices according to the pre-recorded network address of the current device, the network connection retrieving method further comprises:

obtaining a network address and device information of each of the network devices in the local area network;

sending the broadcast packets to each of the network devices in the local area network, and collecting the response message returned from each of the network devices in response to the broadcast packets; and identifying each of the network devices sending the response messages by comparing the network address recorded in each of the response messages with the obtained network address of each of the network devices, and associating the unique identification information recorded in the response message with the network device to be recorded in the master device.

5. The network connection retrieving method according to claim 4, wherein after the step of obtaining the network address and the device information of each of the network devices in the local area network, the network connection retrieving method further comprises:

determining whether an authority for managing the network device is included in the obtained device information of each of the network devices; and establishing the connections with the network devices by using the obtained network addresses of the network devices if the authority is included, and inquiring the unique identification information of the network devices so as to be associated with the network devices and recorded in the master device.

6. The network connection retrieving method according to claim 1, wherein the step of attempting to establish the connection with the current device among the network devices according to the pre-recorded network address of the current device comprises:

attempting to establish the connection with the current device when the connection with the current device is disconnected or when a request for establishing the connection with the current device is received.

7. The network connection retrieving method according to claim 6, wherein when the request for establishing the connection with the current device is received from another network device among the network devices, sending the network address recorded in the response message returned from the current device to said another network device, so as to assist said another network device to re-establish the connection with the current device.

8. The network connection retrieving method according to claim 1, wherein if the network address of the current device cannot be obtained, the master device changes to use another one of the network devices to perform a data synchronization.

9. The network connection retrieving method according to claim 1, wherein the unique identification information comprises one or a combination of Media Access Control Address (MAC Address), a network card name, a device name and a device model of the network device as well as one of a numbering or a serial number generated by one of the network devices.

10. The network connection retrieving method according to claim 9, wherein the numbering or the serial number generated by said one of the network devices is generated by an encoding algorithm executed by said one of the network devices and sent to another one of the network devices in the local area network, and the encoding algorithm comprises MD5, Secure Hash Algorithm 1 (SHA-1), Secure Hash Algorithm 2 (SHA-2), Secure Hash Algorithm 3 (SHA-3), BLAKE2, CubeHash, ECOH, FSB, GOST, HAS-160, HAVAL, Kupyna, LMhash, MD2, MD4, MD6, MDC-2, N-Hash, RIPEMD, RadioGaún, SWIFFT, Snefru, Streebog, Tiger, VSH or Whirlpool.

11. A network system, comprising:
a plurality of network devices, comprising a master device and a plurality of slave devices in a local area network, wherein
the master device comprises:
a communication device, establishing a connection with each of the slave devices;
a storage medium, storing a network address of each of the network devices; and
a processor, coupled to the communication device and the storage medium, and configured to attempt to establish the connection with a current device by using the communication device according to a pre-recorded network address of the current device in the storage medium, wherein
the processor sends a plurality of broadcast packets to each of the network devices in the local area network by the communication device if the connection cannot be established, collects a response message returned from each of the network devices in response to the broadcast packets, identifies the response message returned from the current device by comparing unique identification information recorded in each of the response messages with pre-recorded unique identification information of each of the network devices, and re-establishes the connection with the current device by the communication device using a network address recorded in the identified response message, wherein
the master device is a client server in a Ceph storage architecture, and the rest of the slave devices are storage servers in the Ceph storage architecture, and
wherein when the master device is disconnected from the current device, the master device attempts to retrieve the connection with the current device by the pre-recorded network address within a preset period, and if the connection cannot be retrieved within the preset period, the master device obtains the network address of the current device by sending the broadcast packets and collecting the response messages, and re-establishes the connection with the current device by using the obtained network address.

12. The network system according to claim 11, wherein the processor further obtains the network address and device information from each of the network devices in the local area network, sends a plurality of broadcast packets to each of the network devices in the local area network and collects the response message returned from each of the network devices in response to the broadcast packets by using the communication device, identifies each of the network devices sending the response message by comparing the network address recorded in each of the response messages with the obtained network address of each of the network devices, and associates the unique identification information recorded in the response message with the network device to be recorded in the storage medium.

13. The network system according to claim 12, wherein the processor further determines whether an authority for managing the network device is included in the obtained device information of each of the network devices, establishes the connections with the network devices by using the obtained network addresses of the network devices if the authority is included, and inquires the unique identification information of the network devices so as to be associated with the network devices and recorded in the storage medium.

14. The network system according to claim 11, wherein the processor attempts to establish the connection with the current device when the connection with the current device is disconnected or when a request for establishing the connection with the current device is received.

15. The network system according to claim 14, wherein when the request for establishing the connection with the current device is received from another slave device, the processor sends the network address recorded in the response message returned from the current device to assist said another slave device to re-establish the connection with the current device.

16. The network system according to claim 11, wherein if the network address of the current device cannot be obtained, the master device changes to use another one of the network devices to perform a data synchronization.

17. The network system according to claim 11, wherein the unique identification information comprises one or a combination of Media Access Control Address, a network card name, a device name and a device model of the network device as well as one of a numbering or a serial number generated by one of the network devices.

18. The network system according to claim 17, wherein the numbering or the serial number generated by said one of the network devices is generated by an encoding algorithm executed by said one of the network devices and sent to another one of the network devices in the local area network, and the encoding algorithm comprises MD5, Secure Hash Algorithm 1 (SHA-1), Secure Hash Algorithm 2 (SHA-2), Secure Hash Algorithm 3 (SHA-3), BLAKE2, CubeHash, ECOH, FSB, GOST, HAS-160, HAVAL, Kupyna, LMhash, MD2, MD4, MD6, MDC-2, N-Hash, RIPEMD, RadioGaún, SWIFFT, Snefru, Streebog, Tiger, VSH or Whirlpool.

* * * * *